US008505857B2

(12) United States Patent
Mark et al.

(10) Patent No.: US 8,505,857 B2
(45) Date of Patent: Aug. 13, 2013

(54) SYSTEMS AND METHODS FOR SUPPORTING A PIPE

(75) Inventors: Gillian Mark, Houston, TX (US); Edward Earl Schauseil, II, Sugar Land, TX (US); John J. Pothanikat, Missouri City, TX (US); Jim Williams, Houston, TX (US)

(73) Assignee: Kellogg Brown & Root LLC, Houston, TX (US)

( * ) Notice: Subject to any disclaimer, the term of this patent is extended or adjusted under 35 U.S.C. 154(b) by 82 days.

(21) Appl. No.: 13/165,089

(22) Filed: Jun. 21, 2011

(65) Prior Publication Data

US 2011/0248126 A1    Oct. 13, 2011

Related U.S. Application Data

(63) Continuation-in-part of application No. 11/506,327, filed on Aug. 18, 2006, now Pat. No. 7,467,766.

(51) Int. Cl.
*F16L 3/08* (2006.01)

(52) U.S. Cl.
USPC ............ 248/65; 248/74.1; 248/560; 138/106; 138/149

(58) Field of Classification Search
CPC .... F16L 3/1091; F16L 3/1207; F24F 13/0263
USPC ................. 248/65, 74.1, 560, 562, 609, 634, 248/636; 138/106, 149
See application file for complete search history.

(56) References Cited

U.S. PATENT DOCUMENTS

| 2,790,614 A | 4/1957 | Miller |
| 3,543,804 A | 12/1970 | Ziegler |
| 3,606,218 A | 9/1971 | Enlund et al. |
| 3,856,544 A | 12/1974 | Benner et al. |

(Continued)

FOREIGN PATENT DOCUMENTS

| EP | 0060547 | 3/1982 |
| EP | 0159958 | 2/1985 |

(Continued)

OTHER PUBLICATIONS

Acoustic Insulation, Glacier Bay, Inc. Power and Thermal Management Technologies, Glacier Bay, Inc.

(Continued)

*Primary Examiner* — Anita M King
(74) *Attorney, Agent, or Firm* — KBR's IP Dept (57) ABSTRACT

Systems and methods for supporting one or more pipes are provided. The pipe support system can include a first isolator and a second isolator at least partially disposed about a pipe such that at least a portion of the first and second isolators oppose one another. The pipe support system can also include a third isolator at least partially disposed about the pipe between a first set of ends of the first and second isolators and a fourth isolator at least partially disposed about the pipe between a second set of ends of the first and second isolators such that at least a portion of the third and fourth isolators oppose one another. An inner surface of the combination of the first, second, third, and fourth isolators can surround a perimeter of the pipe to provide an insulated pipe. The pipe system can also include at least one clamp at least partially disposed about the insulated pipe.

19 Claims, 3 Drawing Sheets

(56) References Cited

U.S. PATENT DOCUMENTS

| | | | |
|---|---|---|---|
| 3,891,006 A | 6/1975 | Lee | |
| 3,980,262 A | 9/1976 | Lee | |
| 4,185,802 A | 1/1980 | Myles et al. | |
| 4,323,088 A | 4/1982 | McClellan | |
| 4,530,478 A | 7/1985 | McClellan | |
| 4,539,005 A | 9/1985 | Greenblatt | |
| 4,714,229 A * | 12/1987 | Force et al. | 248/610 |
| 4,787,583 A | 11/1988 | Morton | |
| 4,804,158 A | 2/1989 | Collins et al. | |
| 4,951,902 A | 8/1990 | Hardtke | |
| 5,300,355 A | 4/1994 | Mifune et al. | |
| 5,381,833 A | 1/1995 | Cummings et al. | |
| 5,652,550 A | 7/1997 | Vig | |
| 5,731,359 A | 3/1998 | Moser et al. | |
| 5,855,353 A | 1/1999 | Shaffer et al. | |
| 5,924,656 A | 7/1999 | Okada et al. | |
| 5,942,656 A | 8/1999 | Slaugh et al. | |
| 5,947,425 A | 9/1999 | Gerster | |
| 6,068,882 A | 5/2000 | Ryu | |
| 6,199,595 B1 * | 3/2001 | Baker | 138/149 |
| 6,382,259 B1 | 5/2002 | Codling | |
| 6,403,180 B1 | 6/2002 | Barrall | |
| 6,575,412 B2 | 6/2003 | Klezath | |
| 6,575,738 B1 | 6/2003 | Nguyen et al. | |
| 6,598,358 B1 | 7/2003 | Schwertfeger et al. | |
| 6,604,715 B2 | 8/2003 | Howe | |
| 6,677,034 B1 | 1/2004 | Hooley et al. | |
| 6,989,123 B2 | 1/2006 | Lee et al. | |
| 7,078,359 B2 | 7/2006 | Stepanian et al. | |
| 7,156,126 B2 * | 1/2007 | Topek et al. | 138/117 |
| 7,213,790 B2 | 5/2007 | Bailey et al. | |
| 7,226,243 B2 | 6/2007 | Lee et al. | |
| 7,238,311 B2 | 7/2007 | Ristic-Lehmann et al. | |
| 7,399,439 B2 | 7/2008 | Lee et al. | |
| 7,472,870 B2 | 1/2009 | Zagorski et al. | |
| 7,611,101 B2 | 11/2009 | van Walraven | |
| 2005/0046086 A1 | 3/2005 | Lee et al. | |
| 2005/0155663 A1 | 7/2005 | Dhellemmes et al. | |
| 2005/0167891 A1 | 8/2005 | Lee et al. | |
| 2006/0125158 A1 | 6/2006 | Rouanet et al. | |
| 2006/0196568 A1 | 9/2006 | Leeser et al. | |
| 2006/0272727 A1 | 12/2006 | Dinon et al. | |
| 2007/0004306 A1 | 1/2007 | Leeser et al. | |
| 2007/0154698 A1 | 7/2007 | Stepanian | |
| 2007/0163666 A1 | 7/2007 | Lee et al. | |
| 2007/0173157 A1 | 7/2007 | Trifu et al. | |
| 2007/0220904 A1 | 9/2007 | Jibb et al. | |
| 2007/0264485 A1 | 11/2007 | Stepanian et al. | |
| 2008/0014402 A1 | 1/2008 | Tomich | |
| 2008/0042018 A1 | 2/2008 | Pothanikat et al. | |
| 2008/0087870 A1 | 4/2008 | Williams et al. | |
| 2008/0093016 A1 | 4/2008 | Lee et al. | |

FOREIGN PATENT DOCUMENTS

| | | |
|---|---|---|
| EP | 0884518 | 6/1998 |
| GB | 2315707 | 1/1998 |
| WO | 2006002440 | 1/2006 |

OTHER PUBLICATIONS

Marinite RTM P data sheet, BNZ Materials, Inc., BNZ R-440 Nov. 1992.

Pryogel XT Flexible Industrial Insulation for High-Temperature Applications, Aspen Aerogels Nanotechnology at Work, 2008, pp. 1-2, Aspen Aerogels Inc., Northborough, MA.

Unicoat 5800 material data sheet, Unicoat International.

Smith, Christopher E., Aerogels advance in pipeline, tank storage use, Oil & Gas Journal, Jul. 10, 2006, pp. 1-4, PennWell Publishing Company.

* cited by examiner

SYSTEMS AND METHODS FOR SUPPORTING A PIPE

CROSS-REFERENCE TO RELATED APPLICATIONS

This application is a continuation-in-part (CIP) of U.S. patent application having Ser. No. 12/244,574, filed on Oct. 2, 2008, which is a continuation-in-part (CIP) of U.S. Pat. No. 7,950,609, filed on Jul. 18, 2008, which is a continuation-in-part (CIP) of U.S. Pat. No. 7,467,766 having Ser. No. 11/506,327, filed on Aug. 18, 2006, which are all incorporated by reference herein.

BACKGROUND

1. Field

Embodiments described generally relate to systems and methods for supporting a pipe. More particularly, such embodiments relate to systems and methods for supporting an insulated pipe.

2. Description of the Related Art

Pipe supports or "pipe shoes" are used in various industries to support pipes or piping. Insulation is typically installed around the pipes when hot or cold fluids are conveyed therethrough. As such, the insulation, whether insulating hot or cold fluids, must be capable of not only providing the desired level of thermal insulation, but must also be capable of supporting the weight of the pipe and the fluid(s) flowing therethrough because the insulation is sandwiched between the pipe and the pipe support.

Depending on the particular level of thermal insulation required for a particular pipe, the insulation will be wrapped or otherwise disposed about the outer perimeter of the pipe, which increases the outer perimeter of the pipe. Accordingly, insulated pipes have an increased cross-sectional area as compared to the piping alone. Increasing the cross-sectional area of the pipes by placing insulation thereabout reduces the number of insulated pipes that can be fit into a given area. For example, pipe racks for holding multiple segments of pipe arranged in horizontal and vertical rows, e.g., a pipe rack disposed on a LNG tanker, have fixed dimensions. As such, increasing the thickness of the insulation disposed about the pipes decreases the number of insulated pipes that can fit into the pipe rack as compared to the pipes when not insulated.

There is a need, therefore, for improved systems and methods for decreasing the overall perimeter of insulated pipes to support, among other things, increasing the number of insulated pipes that can be fit into a given area.

DETAILED DESCRIPTION

Systems and methods for supporting one or more pipes are provided. In one or more embodiments, the pipe support system can include a first isolator and a second isolator at least partially disposed about a pipe such that at least a portion of the first and second isolators oppose one another. The pipe support system can also include a third isolator at least partially disposed about the pipe between a first set of ends of the first and second isolators and a fourth isolator at least partially disposed about the pipe between a second set of ends of the first and second isolators such that at least a portion of the third and fourth isolators oppose one another. An inner surface of the combination of the first, second, third, and fourth isolators can surround a perimeter of the pipe to provide an insulated pipe. The pipe system can also include at least one clamp at least partially disposed about the insulated pipe.

Figure 1:
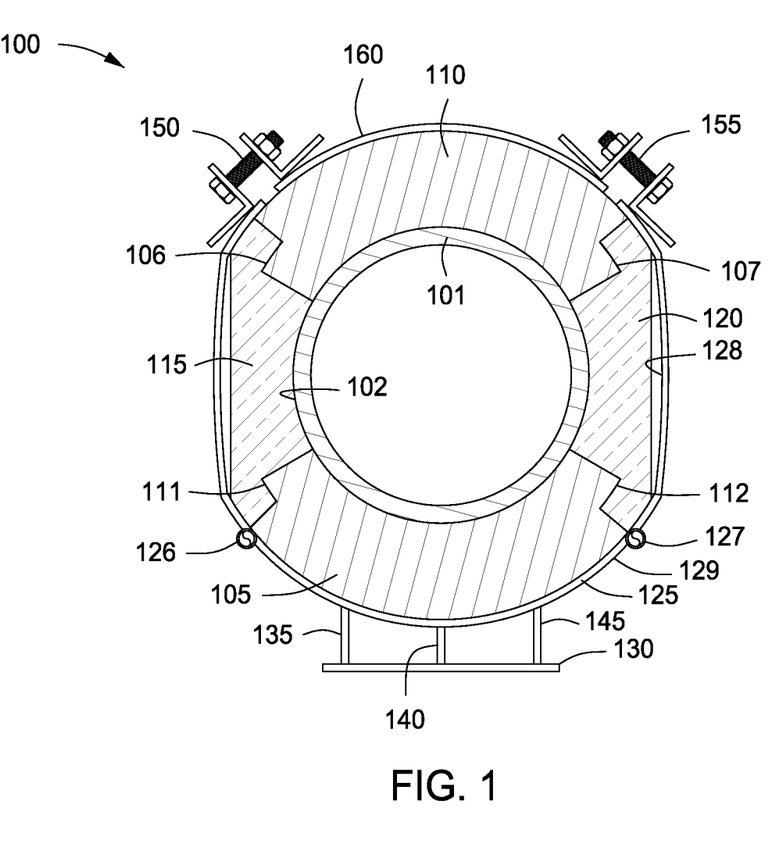
FIG. 1 depicts an end view of an illustrative pipe support system, according to one or more embodiments described.
Figure 2:
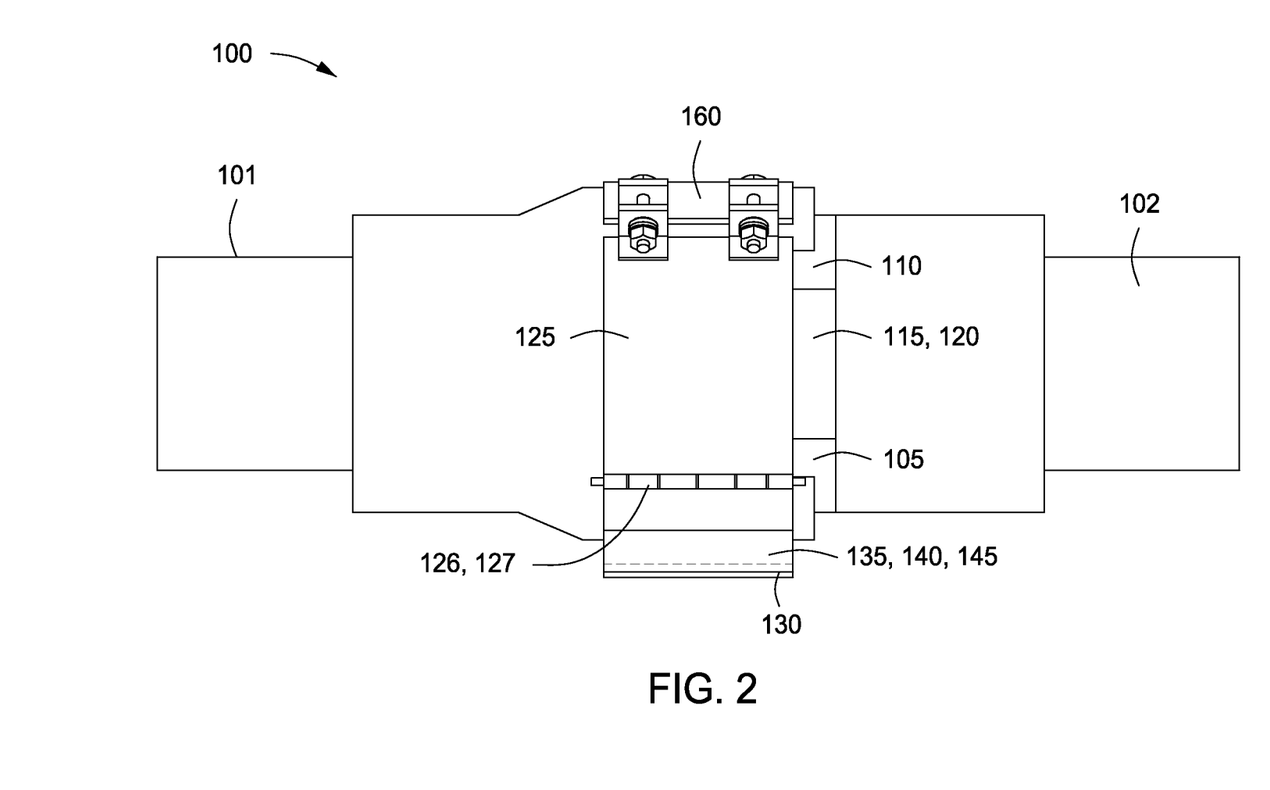
FIG. 2 depicts a side elevation view of the illustrative pipe support system shown in FIG. 1.

FIGS. 1 and 2 depict an end view and a side elevation view, respectively, of an illustrative pipe support system 100, according to one or more embodiments. Referring to FIGS. 1 and 2, the pipe support system 100 can include, but is not limited to, one or more isolators or barriers (four are shown 105, 110, 115, and 120), one or more clamps 125, one or more support bases 130, and one or more support members (three are shown 135, 140, 145). The one or more isolators 105, 110, 115, 120, clamps 125, support bases 130, and support members 135, 140, 145 can be arranged or configured with respect to one another to provide the pipe support system 100. For example, the first, second, third, and fourth isolators 105, 110, 115, 120 can be disposed or arranged about the pipe 101. The clamp 125 can be disposed about the first, second, third, and fourth isolators 105, 110, 115, and 120. The clamp 125 can be connected, joined, or otherwise coupled to the support base 130 directly or via the support members 135, 140, 145 as depicted to provide the pipe support system 100.

The first isolator 105 and the second isolator 110 can be at least partially disposed about the pipe 101 such that at least a portion of the first isolator 105 opposes at least a portion of the second isolator 110. For example, the first and second isolators 105, 110 can be disposed adjacent an outer surface 102 of the pipe 101 such that at least a portion of the first and second isolators 105, 110 oppose one another with the pipe 101 located therebetween. In another example, the first and second isolators 105, 110 can be disposed adjacent the outer surface 102 of the pipe 101 such that a center of the first isolator 105 opposes a center of the second isolator 110 with the pipe 101 located between the first and second isolators 105, 110. The first isolator 105 and the second isolator 110 can each have a first end 106, 111, respectively, and a second end 107, 112, respectively.

A distance or length between the first and second ends 106, 107 of the first isolator 105 can be the same or different as a distance or length between the first and second ends 111, 112 of the second isolator 110. For example, the length between the first and second ends 106, 107 of the first isolator 105 can be less than the length between the first and second ends 111, 112 of the second isolator 110. As such, the first and second isolators 105, 110 can be disposed about and traverse the outer surface 102 of the pipe 101 an equal amount or a non-equal amount.

The third isolator 115 and the fourth isolator 120 can be at least partially disposed about the pipe 101, each between a first set of ends 106, 111 and a second set of ends 107, 112, respectively, of the first and second isolators 105, 110. In one or more embodiments, the first set of ends 106, 111 of the first and second isolators 105, 110 can be proximate or adjacent to opposing ends of the third isolator 115. For example, the first set of ends 106, 111 of the first and second isolators 105, 110 can contact the opposing ends of the third isolator 115. In one or more embodiments, the second set of ends 107, 112 of the first and second isolators 105, 110 can be proximate or adjacent to opposing ends of the fourth isolator 120. For example, the second set of ends 107, 112 can contact the opposing ends of the fourth isolator 120. At least a portion of the third isolator 115 can oppose at least a portion of the fourth isolator 120. For example, the third and fourth isolators 115, 120 can be disposed adjacent the outer surface 102 of the pipe 101 such that at least a portion of the third and fourth isolators 115, 120 oppose one another with the pipe 101 located therebetween. In another example, the third and fourth isolators 115, 120 can be disposed adjacent the outer surface 102 of the pipe 101 such that a center of the third isolator 115 opposes a center of the fourth isolator 120 with the pipe 101 located between the third and fourth isolators 115, 120.

A length or distance between the first set of ends 106, 111 and the second set of ends 107, 112, respectively, of the first and second isolators 105, 110 can be the same or different. For example, the length between the first set of ends 106, 111 can be less than the length between the second set of ends 107, 112. In another example, the length between the first set of ends 106, 111 can be greater than the length between the second set of ends 107, 112. As such, a length or distance between the opposing ends of the third and fourth isolators 115, 120 can be the same or different with respect to one another. As such, the third and fourth isolators 115, 120 can be disposed about and traverse the outer surface 102 of the pipe 101 an equal amount or a non-equal amount.

The first, second, third, and fourth isolators 105, 110, 115, and 120, respectively, or any combination thereof can be pre-formed into semi-circular bodies having a suitable inner diameter. For example, the first, second, third, and fourth isolators 105, 110, 115, and 120 can each be formed into approximately quarter-circle pre-formed sections that, when aligned adjacent one another, provide an inner bore therethrough configured to conform to the outer surface 102 of the pipe 101. Said another way, the first, second, third, and fourth isolators 105, 110, 115, and 120, respectively, can be aligned adjacent one another to form a tubular interior surface therewithin.

The first, second, third, and fourth isolators 105, 110, 115, and 120, respectively, can be disposed about the outer surface 102 of the pipe 101 such that the outer surface 102 can be partially or completely surrounded to provide an insulated pipe. The first, second, third, and fourth isolators 105, 110, 115, 120 can be in direct contact with the outer surface 102 of the pipe 101. The first, second, third, and fourth isolators 105, 110, 115, 120 can be disposed adjacent the outer surface 102 of the pipe 101, but not in direct contact with the pipe 101. For example, although not shown, one or more additional isolators, e.g., a fifth isolator, can be disposed about the outer surface 102 of the pipe 101 such that the one or more additional isolators are located between the outer surface 102 of the pipe 101 and the first, second, third, and/or fourth isolators 105, 110, 115, and 120. The one or more additional isolators can be disposed partially or completely about the outer perimeter of the pipe 101. In another example, although not shown, one or more additional isolators, e.g., a sixth isolator, can be disposed about the first, second, third, fourth isolators 105, 110, 115, 120 such that the one or more additional isolators are located between an outer surface formed by the first, second, third, and fourth isolators 105, 110, 115, 120 and an inner or interior surface 128 of the clamp 125. In still another example, although not shown, one or more additional isolators, e.g., the fifth additional isolator and the sixth additional isolator, can be disposed about the outer surface 102 of the pipe 101 and the outer surface formed by the first, second, third, and fourth isolators 105, 110, 115, 120, respectively.

The clamp 125 can be adapted to exert forces on the first and second isolators 105, 110 such that the insulated pipe can be secured to the support base 130 or to any other known support (not shown). The clamp 125 can be adapted to exert greater forces on the first and second isolators 105, 110 than any forces exerted by the clamp 125 on the third and fourth isolators 115, 120. The forces exerted by the clamp 125 on the first and second isolators 105, 110 can oppose one another. The forces, if any, exerted by the clamp 125 on the third and fourth isolators 115, 120 can oppose one another. The clamp 125 can be adapted to exert pressure on the third and fourth isolators 115, 120 such that a thickness of the third and fourth isolators 115, 120 is decreased by about 1% all the way to about 60%. For example, the force exerted by the clamp 125 on the third and fourth isolators 115, 120 can decrease the thickness of the third and fourth isolators 115, 120 less than about 50%, less than about 40%, less than about 30%, less than about 20%, less than about 15%, less than about 10%, less than about 5%, or less than about 3%. In another example, the clamp 125 can be adapted such that the inner or interior surface 128 of the clamp 125 does not touch the third and fourth isolators 115, 120.

The amount of the forces exerted by the clamp 125 on at least the first and second isolators 105, 110 can depend, at least in part, on the diameter of the pipe 101. The forces exerted by the clamp 125 on the first and second isolators 105, 110 can range from a low of about 1,000 N to a high of about 100,000 N. For example, the forces exerted by the clamp 125 on the first and second isolators 105, 110 can be about 2,000 N, about 3,000 N, or about 4,000 N. In another example, the force exerted by the clamp 125 on the first and second isolators 105, 110 can range from about 3,000 N to about 8,000 N or from about 10,000 N to about 45,000 N. In another example, the clamp 125 can exert forces ranging from a low of about 1,000 N, about 5,000 N, or about 10,000 N to a high of about 45,000 N, about 55,000 N, about 65,000 N, about 75,000 N, about 85,000 N, or about 95,000 N on the first and second isolators 105, 110. In another example, the clamp 125 can exert forces ranging from about 5,000 N to about 100,000 N or higher on the first and second isolators 105, 110. In another example, the clamp 125 can exert forces ranging from about 1,000 N to about 100,000 N on the first and second isolators 105, 110 and the forces, if any, exerted on the third and fourth isolators 115, 120 can be less than the forces exerted on the first and second isolators 105, 110. In a specific example, if the pipe 101 has a diameter of about 4 inches, the forces exerted by the clamp 125 on the first and second isolators 105, 110 can range from about 1,000 N to about 5,000 N. In another specific example, if the pipe 101 has a diameter of about 24 inches, the forces exerted by the clamp 125 on the first and second isolators 105, 110 can range from about 30,000 N to about 60,000 N.

The first isolator 105 can have a first thickness or a first average thickness and the second isolator 110 can have a second thickness or a second average thickness, as measured perpendicularly from a side adjacent the pipe surface 102 to a side adjacent an exterior surface of the respective isolator. The first and second thicknesses can be the same or different with respect to one another. The first and second average thicknesses can be the same or different with respect to one another. The third isolator 115 can have a third thickness or a third average thickness, and the fourth isolator 120 can have a fourth thickness or a fourth average thickness, as measured perpendicularly from a side adjacent the pipe surface 102 to a side adjacent an exterior surface of the respective isolator. The third and fourth thicknesses can be the same or different with respect to one another. The third and fourth average thicknesses can be the same or different with respect to one another. Preferably, the third and fourth thicknesses or average thicknesses each measure less than each of the first and second thicknesses or average thicknesses. As depicted in FIG. 1, the thickness or average thickness of the first and second isolators 105, 110 can be greater than the thickness or average thickness of the third and fourth isolators 115, 120 to provide an insulated pipe having a non-uniform cross-sectional length.

Opposing locations on an exterior surface 129 of the clamp 125 adjacent the first and second isolators 105, 110 can be further away from one another than opposing locations on the exterior surface 129 of the clamp 125 adjacent the third and fourth isolators 115, 120. For example, the exterior surface 129 of the clamp 125 can have an elliptical shape, an oval shape, or some other non-uniform cross-sectional shape. Opposing locations on the interior surface 128 of the clamp 125 adjacent the first and second isolators 105, 110 can be further away from one another than opposing locations on the interior surface 128 of the clamp 125 adjacent the third and fourth isolators 115, 120. For example, the interior surface 128 of the clamp 125 can have an elliptical shape, an oval shape, or some other non-uniform cross-sectional shape.

The length between two opposing points on the exterior surface 129 of the clamp 125 adjacent the first and second isolators 105, 110 (a "first length") divided by the length between two opposing points on the exterior surface 129 of the clamp 125 adjacent the third and fourth isolators 115, 120 (a "second length") can be any value greater than 1. For example, the first length divided by the second length can range from a low of about 1.01, about 1.05, about 1.1, about 1.2, or about 1.3 to a high of about 1.5, about 1.6, about 1.7, about 1.8, about 1.9, about 2.0, or higher. In another example, the first length divided by the second length can range from about 1.01 to about 2.0, about 1.05 to 1.7, about 1.1 to about 1.6, or about 1.2 to about 1.5. In another example, the first length divided by the second length can be at least 1.01, at least 1.05, at least 1.10, at least 1.2, at least 1.3, at least 1.4, at least 1.5, at least 1.6, at least 1.7, at least 1.8, at least 1.9, or at least 2.0.

The two opposing points on the exterior surface 129 of the clamp 125 adjacent the first and second isolators 105, 110 can define a first straight reference line (not shown) through a longitudinal center-line of the pipe 101 and perpendicular to the surface of the support base 130 depicted in FIG. 1. The two opposing points on the exterior surface 129 of the clamp 125 adjacent the third and fourth isolators 115, 120 can define a second straight reference line (not shown) through the longitudinal center-line of the pipe 101 and perpendicular to the first straight reference line. The length or distance between the two opposing points located along the first straight reference line (a "third length"), divided by the length or distance between the two opposing points located along the second straight reference line (a "fourth length") can be any value greater than 1. For example, the third length divided by the fourth length can range from a low of about 1.01, about 1.05, about 1.1, about 1.2, or about 1.3 to a high of about 1.5, about 1.6, about 1.7, about 1.8, about 1.9, about 2.0, or higher. In another example, the third length divided by the fourth length can be from about 1.01 to about 2.0, about 1.05 to 1.7, about 1.1 to about 1.6, or about 1.2 to about 1.5. In another example, the third length divided by the fourth length can be at least 1.01, at least 1.05, at least 1.10, at least 1.2, at least 1.3, at least 1.4, at least 1.5, at least 1.6, at least 1.7, at least 1.8, at least 1.9, or at least 2.0.

The length between two opposing points on the inner surface 128 of the clamp 125 adjacent the first and second isolators 105, 110 (a "fifth length") divided by the length between two opposing points on the inner surface 128 of the clamp 125 adjacent the third and fourth isolators 115, 120 (a "sixth length") can be any value greater than 1. For example, the fifth length divided by the sixth length can range from a low of about 1.01, about 1.05, about 1.1, about 1.2, or about 1.3 to a high of about 1.5, about 1.6, about 1.7, about 1.8, about 1.9, about 2.0, or higher. In another example, the fifth length divided by the sixth length can range from about 1.01 to about 2.0, about 1.05 to 1.7, about 1.1 to about 1.6, or about 1.2 to about 1.5. In another example, the fifth length divided by the sixth length can be at least 1.01, at least 1.05, at least 1.10, at least 1.2, at least 1.3, at least 1.4, at least 1.5, at least 1.6, at least 1.7, at least 1.8, at least 1.9, or at least 2.0.

The two opposing points on the inner surface 128 of the clamp 125 adjacent the first and second isolators 105, 110 can define a third straight reference line (not shown) through a longitudinal center-line of the pipe 101 and perpendicular to the surface of the support base 130 depicted in FIG. 1. The two opposing points on the inner surface 128 of the clamp 125 adjacent the third and fourth isolators 115, 120 can define a fourth straight reference line (not shown) through the longitudinal center-line of the pipe 101 and perpendicular to the third straight reference line. The length or distance between the two opposing points located along the third straight reference line (a "seventh length"), divided by the length or distance between the two opposing points located along the fourth straight reference line (an "eighth length") can be any value greater than 1. For example, the seventh length divided by the eighth length can range from a low of about 1.01, about 1.05, about 1.1, about 1.2, or about 1.3 to a high of about 1.5, about 1.6, about 1.7, about 1.8, about 1.9, about 2.0, or higher. In another example, the seventh length divided by the eighth length can be from about 1.01 to about 2.0, about 1.05 to 1.7, about 1.1 to about 1.6, or about 1.2 to about 1.5. In another example, the seventh length divided by the eighth length can be at least 1.01, at least 1.05, at least 1.10, at least 1.2, at least 1.3, at least 1.4, at least 1.5, at least 1.6, at least 1.7, at least 1.8, at least 1.9, or at least 2.0.

The first ends 106, 111 and the second ends 107, 112 can have any desired surface configuration or topography. For example, at least one of the first end 106 and the second end 107 of the first isolator 105 and the first end 111 and the second end 112 of the second isolator 110 can be planar. In another example at least one of the first end 106 and the second end 107 of the first isolator 105 and the first end 111 and the second end 112 of the second isolator 110 can be non-planar. Non-planar configurations can include any desired geometry. For example, at least one of the first ends 106, 111 and the second ends 107, 112 can include step-wise transitions, ridges, grooves, curves, undulations, or any combination thereof. For example, as shown in FIG. 1, the first and second ends 106, 107 of the first isolator 105 and the first and second ends 111, 112 of the second isolator 110 each include a stepwise transition. The topography at the ends 106, 107, 111, 112 can support a lower heat transfer coefficient at the interfaces between the adjacent isolators 105, 110, 115, and 120 by providing the non-planar surfaces. The desired surface configuration or topography of the third and fourth isolators 115, 120 can be complimentary to the particular configuration of the ends of the first and second isolators 105, 110.

The first isolator 105 and the second isolator 110 can be formed or made from the same or different materials, a first material. Preferably, at least a portion of the first isolator 105 and the second isolator 110 can be formed or made from mineral wool or a high density polyurethane such as sprayed or preformed urethane foam insulation.

The first isolator 105 and the second isolator 110 can be subjected to a high compressive load. The first material can be suitable for use in cryogenic, ambient, and/or elevated temperatures. The first isolator 105 and the second isolator 110 can be flame resistant and/or incombustible. The first isolator 105 and the second isolator 110 can be a fiber-reinforced calcium silicate, such as that commercially available under the trade designations MARINITE, MARINITE P, MARINITE L, SUPER FIRETEMP L, and the like. Other materials that may be suitable for the first and second isolators 105, 110 can include, but are not limited to filled epoxy, laminated wood, glass-fibers, and formed glass, for example.

The third isolator 115 and the fourth isolator 120 can be formed or made from the same or different materials, a second material. The first material from which the first isolator 105 and the second isolator 110 can be formed or made can be different from the second material from which the third isolator 115 and the fourth isolator 120 can be formed or made. The first material can be structurally more rigid than the second material. The second material can be suitable for use in cryogenic, ambient, and/or elevated temperatures. The second material can have a lower thermal conductivity than the first material. The second material can have a thermal conductivity less than about 50 mW/m*K, about 40 mW/m*K, about 30 mW/m*K, about 25 mW/m*K, about 20 mW/m*K, about 15 mW/m*K, about 10 mW/m*K, or less. In one example, at least a portion of the third isolator 115 and the fourth isolator 120 can be formed or made from aerogel and at least a portion of the first isolator 105 and the second isolator 110 can be formed or made from mineral wool and/or a high density polyurethane. In another example, at least a portion of the third isolator 115 and the fourth isolator 120 can be formed or made from aerogel and at least a portion of the first isolator 105 and the second isolator 110 can be formed or made from calcium silicate, e.g., fiber reinforced calcium silicate.

Suitable material from which the third isolator 115 and the fourth isolator 120 can be formed or made from can include, but is not limited to, aerogels such as silica aerogels, woven fibers, non-woven fibers, or any combination thereof. In at least one specific embodiment, the third isolator 115 and the fourth isolator 120 can be made of a silica aerogel that is reinforced with a non-woven, glass-fiber matting, such as PYROGEL® XT that is available from Aspen Aerogels, Inc. In at least one specific embodiment the third isolator 115 and the fourth isolator 120 can be made of a silica aerogel that is reinforced with fibers, such as CRYOGEL® Z and SPACELOFT® that are also available from Aspen Aerogels, Inc. In at least one specific embodiment the third isolator 115 and the fourth isolator 120 can be a silica aerogel such as NANOGEL® available from Cabot Corporation. In one or more embodiments, other suitable aerogels can include carbon and/or alumina based aerogels.

The clamp 125 can include one or more hinges, two are shown 126, 127, to support disposing the clamp 125 about the insulated pipe, for example the first, second, third, and fourth isolators 105, 110, 115, and 120 and the pipe 101. The hinges 126, 127 can permit sides of the clamp 125 to be opened or otherwise moved away from one another thereby allowing the clamp 125 to be more easily disposed about the insulated pipe.

The clamp 125 can include one or more fasteners, two are shown 150, 155, and a lid 160 for securing the clamp about the insulated pipe. The fasteners 150, 155 and the lid 160 can allow for thermal expansion and contraction of the clamp 125 during thermal cycling. Suitable fasteners 150, 155 can include, but are not limited to bolts and nuts, rivets, screws, male/female connecting devices, threaded rods, pins, and the like. One or more Bellville spring washers, not shown, can be used in conjunction with the fasteners 150 and 155 to maintain clamping pressures between the clamp 125 and the insulated pipe. For example, during various temperature cycling conditions, the Belleville spring washers can account for expansion and/or contraction of the clamp 125 about the insulated pipe such that the clamping pressure stays within predetermined values. The lid 160 can also be removed when disposing the clamp 125 about the insulated pipe.

The insulated pipe having the first, second, third, and fourth isolators 105, 110, 115, and 120 disposed thereabout can be used to store and/or convey one or more fluids therethrough. The one or more fluids can be below ambient temperature, at ambient temperature, or above ambient temperature. In one example, the one or more fluids that can be stored and/or conveyed through the insulated pipe can be at a temperature of less than about 0° C., less than about −25° C., less than about −50° C., less than about −75° C., less than about −100° C., less than about −125° C., less than about −150° C., less than about −160° C., less than about −165° C., less than about −175° C., less than about −185° C., or less than about −195° C. In another example, the one or more fluids that can be stored and/or conveyed through the insulated pipe can be at a temperature greater than 0° C., greater than about 50° C., about 100° C. or more, about 125° C. or more, about 150° C. or more, about 175° C. or more, about 200° C. or more, or about 215° C. or more.

Figure 3:
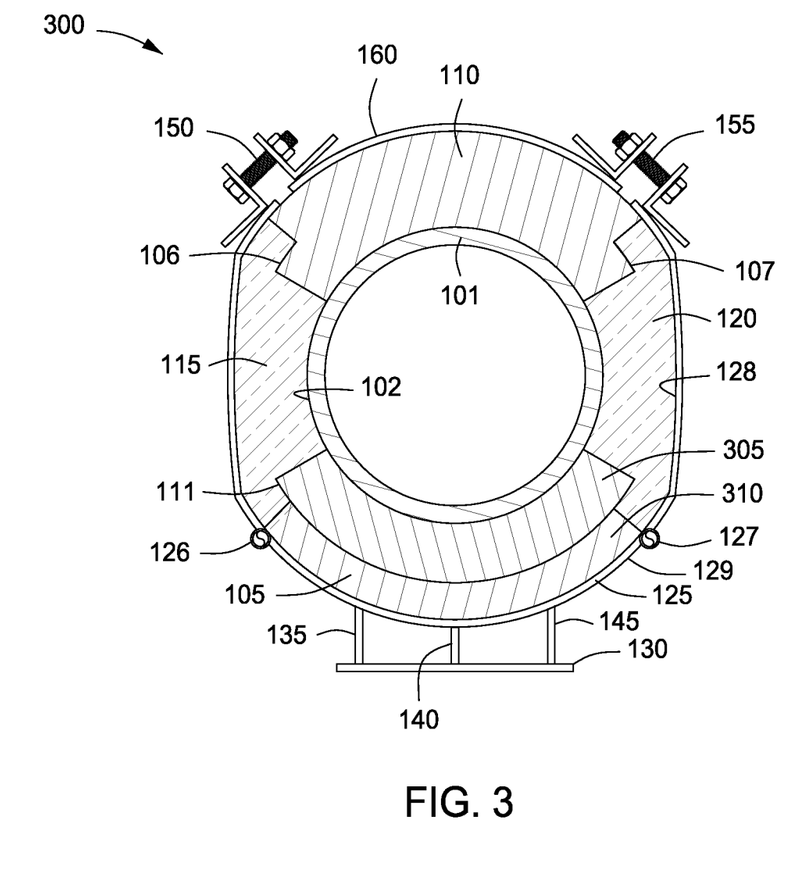
FIG. 3 depicts an end view of another illustrative pipe support system, according to one or more embodiments described.

FIG. 3 depicts an end view of another illustrative pipe support system 300, according to one or more embodiments. The pipe support system 300 can include the first, second, third, and fourth isolators 105, 110, 115, and 120. The first isolator 105 and the second isolator 110 or both can include two or more independent bodies. For example as depicted in FIG. 3, the first isolator 105 can include an inner isolator layer 305, a first independent body, and an outer isolator layer 310, a second independent body. The outer isolator layer 310 can be disposed about the inner isolator layer 305. The inner isolator layer 305 and the outer isolator layer 310 can be made from the same or different materials. In one example, at least a portion of the inner isolator layer 305 and the outer isolator layer 310 can be formed or made from mineral wool or a high density polyurethane such as sprayed or preformed urethane foam insulation. The inner isolator layer 305 or the outer isolator layer 310 can prevent a thermal gradient induced crack from propagating through the entire thickness of the first isolator 105, preventing failure of a vapor barrier that may be provided by the first isolator 105. In another example, at least a portion of the inner isolator layer 305 and the outer isolator layer 310 can be formed or made from calcium silicate, e.g., fiber reinforced calcium silicate.

The outer isolator layer 310 and the inner isolator layer 305 can be preformed and glued together using one or more adhesives. The outer isolator layer 310 can be glued or otherwise secured to the inner isolator layer 305 to provide an integrated first isolator 105. Pre-forming and adhering the outer isolator layer 310 and the inner isolator layer 305 can reduce installation time and cost. Any suitable adhesive can be used to glue the outer isolator layer 310 to the inner isolator layer 305. Illustrative adhesives can include, Duro-Tak 80-1068, available from National Starch and Chemical Company or Dap Weldwood 0306, available from DAP International.

Embodiments of the present disclosure further relate to any one or more of the following paragraphs:

1. A pipe support system, including: a first isolator and a second isolator at least partially disposed about a pipe such that at least a portion of the first and second isolators oppose one another; a third isolator at least partially disposed about the pipe between a first set of ends of the first and second isolators; a fourth isolator at least partially disposed about the pipe between a second set of ends of the first and second isolators such that at least a portion of the third and fourth isolators oppose one another, wherein an inner surface of the combination of the first, second, third, and fourth isolators surround a perimeter of the pipe to provide an insulated pipe; and at least one clamp at least partially disposed about the insulated pipe.

2. The system according to paragraph 1, wherein a thickness of the first and second isolators is greater than a thickness of the third and fourth isolators.

3. The system according to paragraph 1 or 2, wherein a thickness of the first and second isolators is greater than a thickness of the third and fourth isolators to provide an insulated pipe having a non-uniform cross-sectional length and wherein opposing locations on an inner surface and/or an outer surface of the clamp adjacent the first and second isolators are further away from one another than opposing locations on the inner and/or outer surface of the clamp adjacent the third and fourth isolators.

4. The system according to any one of paragraphs 1 to 3, wherein the clamp is adapted to exert greater forces on the first and second isolators than forces exerted on the third and fourth isolators.

5. The system according to paragraph 4, wherein the clamp is disposed completely about the insulated pipe.

6. The system according to paragraph 4, wherein the forces exerted on the first and second isolators oppose one another.

7. The system according to any one of paragraphs 1 to 6, wherein the first and the second isolators are made of a first material, wherein the third and fourth isolators are made of a second material, and wherein the first and second materials are different.

8. The system according to paragraph 7, wherein the first material is structurally more rigid than the second material.

9. The system according to paragraph 7, wherein the second material has a lower thermal conductivity than the first material.

10. The system according to paragraph 7, wherein the first material comprises a urethane foam insulation, and wherein the second material comprises aerogel.

11. The system according to any one of paragraphs 1 to 10, wherein each end of the first set of ends of the first and second isolators comprise non-planar surfaces; and wherein each end of the second set of ends of the first and second isolators comprise non planar surfaces.

12. The system according to any one of paragraphs 1 to 11, wherein at least one of the first isolator, the second isolator, the third isolator, and the fourth isolator comprise two or more independent bodies.

13. The system according to any one of paragraphs 1 to 12, wherein the first isolator and the second isolator each comprise two or more independent bodies, and wherein the third and fourth isolator each comprise a single body.

14. The system according to any one of paragraphs 1 to 14, wherein the insulated pipe is located in a pipe rack.

15. A method for insulating a pipe, including: disposing a first isolator and a second isolator about a pipe such that at least a portion of the first and second isolators oppose one another; disposing a third isolator about the pipe between a first set of ends of the first and second isolators; disposing a fourth isolator about the pipe between a second set of ends of the first and second isolators, wherein at least a portion of the third and fourth isolators oppose one another, and wherein the first, second, third, and fourth isolators surround a perimeter of the pipe to provide an insulated pipe; and supporting the insulated pipe within at least one clamp disposed about the insulated pipe, wherein the clamp is adapted to exert forces on the first and second isolators.

16. The method according to paragraph 15, wherein disposing a first isolator and a second isolator comprises spray application of the first and second isolators about a portion of the pipe.

17. The method according to paragraph 15 or 16, wherein the forces exerted on the first and second opposed isolators is greater than forces exerted by the clamp on the third and fourth opposed isolators.

18. The method according to paragraph 15 or 16, wherein the clamp is adapted to exert greater forces on the first and second isolators than forces exerted on the third and fourth isolators.

19. A pipe support system, including: at least four isolators, wherein the isolators are adapted to form a tubular interior surface when aligned adjacent one another, wherein at least a portion of a first and a second isolator oppose one another when the at least four isolators are aligned adjacent one another; and at least one clamp adapted to at least partially surround the at least four isolators and exert forces on the first and second opposed isolators.

20. The system according to paragraph 19, wherein the first and the second isolators are made of a first material, wherein the third and fourth isolators are made of a second material, and wherein the first and second materials are different.

21. The system according to paragraph 20, wherein the second material has a lower thermal conductivity than the first material.

22. The system according to any one of paragraphs 19 to 21, wherein a thickness of the first and second isolators is greater than a thickness of the third and fourth isolators to provide an insulated pipe having a non-uniform cross-sectional length, and wherein opposing locations on an inner surface and/or an outer surface of the clamp adjacent the first and second isolators are further away from one another than opposing locations on the inner surface and/or outer surface of the clamp adjacent the third and fourth isolators.

23. The system according to any one of paragraphs 19 to 22, wherein the forces exerted on the first and second opposed isolators is greater than forces exerted by the clamp on the third and fourth opposed isolators.

24. The system according to any one of paragraphs 19 to 22, wherein the clamp is adapted to exert greater forces on the first and second isolators than forces exerted on the third and fourth isolators.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A pipe support system, comprising:
a first isolator and a second isolator at least partially disposed about a pipe such that at least a portion of the first and second isolators oppose one another;
a third isolator at least partially disposed about the pipe between a first set of ends of the first and second isolators;
a fourth isolator at least partially disposed about the pipe between a second set of ends of the first and second isolators such that at least a portion of the third and fourth isolators oppose one another, wherein an inner surface of the combination of the first, second, third, and fourth isolators surround a perimeter of the pipe to provide an insulated pipe; and
at least one clamp at least partially disposed about the insulated pipe.

2. The system of claim 1, wherein a thickness of the first and second isolators is greater than a thickness of the third and fourth isolators.

3. The system of claim 1, wherein a thickness of the first and second isolators is greater than a thickness of the third and fourth isolators to provide an insulated pipe having a non-uniform cross-sectional length and wherein opposing locations on an inner surface of the clamp adjacent the first and second isolators are further away from one another than opposing locations on the inner surface of the clamp adjacent the third and fourth isolators.

4. The system of claim 1, wherein the clamp is adapted to exert greater forces on the first and second isolators than forces exerted on the third and fourth isolators.

5. The system of claim 4, wherein the clamp is disposed completely about the insulated pipe.

6. The system of claim 4, wherein the forces exerted on the first and second isolators oppose one another.

7. The system of claim 1, wherein the first and the second isolators are made of a first material, wherein the third and fourth isolators are made of a second material, and wherein the first and second materials are different.

8. The system of claim 7, wherein the first material is structurally more rigid than the second material.

9. The system of claim 7, wherein the second material has a lower thermal conductivity than the first material.

10. The system of claim 7, wherein the first material comprises a urethane foam insulation, and wherein the second material comprises aerogel.

11. The system of claim 1, wherein each end of the first set of ends of the first and second isolators comprise non-planar surfaces; and wherein each end of the second set of ends of the first and second isolators comprise non planar surfaces.

12. The system of claim 1, wherein at least one of the first isolator, the second isolator, the third isolator, and the fourth isolator comprise two or more independent bodies.

13. The system of claim 1, wherein the first isolator and the second isolator each comprise two or more independent bodies, and wherein the third and fourth isolator each comprise a single body.

14. The system of claim 1, wherein the insulated pipe is located in a pipe rack.

15. A method for supporting a pipe, comprising:
disposing a first isolator and a second isolator about a pipe such that at least a portion of the first and second isolators oppose one another;
disposing a third isolator about the pipe between a first set of ends of the first and second isolators;
disposing a fourth isolator about the pipe between a second set of ends of the first and second isolators, wherein at least a portion of the third and fourth isolators oppose one another, and wherein the first, second, third, and fourth isolators surround a perimeter of the pipe to provide an insulated pipe; and
supporting the insulated pipe within at least one clamp disposed about the insulated pipe, wherein the clamp is adapted to exert forces on the first and second isolators.

16. The method of claim 15, wherein disposing a first isolator and a second isolator comprises spray application of the first and second isolators about a portion of the pipe.

17. A pipe support system, comprising:
at least four isolators, wherein the isolators are adapted to form a tubular interior surface when aligned adjacent one another, wherein at least a portion of a first and a second isolator oppose one another when the at least four isolators are aligned adjacent one another, wherein first and the second isolators are made of a first material, wherein third and fourth isolators are made of a second material, and wherein the first and second materials are different; and
at least one clamp adapted to at least partially surround the at least four isolators and exert forces on the first and second opposed isolators.

18. The system of claim 17, wherein the second material has a lower thermal conductivity than the first material.

19. The system of claim 17, wherein a thickness of the first and second isolators is greater than a thickness of the third and fourth isolators to provide an insulated pipe having a non-uniform cross-sectional length, and wherein opposing locations on an inner surface of the clamp adjacent the first and second isolators are further away from one another than opposing locations on the inner surface of the clamp adjacent the third and fourth isolators.

* * * * *